United States Patent
Nishie et al.

(10) Patent No.: US 9,716,290 B2
(45) Date of Patent: Jul. 25, 2017

(54) NONAQUEOUS ELECTROLYTE SECONDARY BATTERY AND METHOD FOR PRODUCING NONAQUEOUS ELECTROLYTE SECONDARY BATTERY

(71) Applicant: GS Yuasa International Ltd., Kyoto-shi, Kyoto (JP)

(72) Inventors: Katsushi Nishie, Kyoto (JP); Yudai Kawasoe, Kyoto (JP); Takeshi Hachida, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 14/432,686

(22) PCT Filed: Mar. 18, 2013

(86) PCT No.: PCT/JP2013/001819
§ 371 (c)(1),
(2) Date: Mar. 31, 2015

(87) PCT Pub. No.: WO2014/054197
PCT Pub. Date: Apr. 10, 2014

(65) Prior Publication Data
US 2015/0270575 A1    Sep. 24, 2015

(30) Foreign Application Priority Data

Oct. 3, 2012 (JP) .................................. 2012-221418

(51) Int. Cl.
| | | |
|---|---|---|
| *H01M 10/0567* | (2010.01) | |
| *H01M 10/0568* | (2010.01) | |
| *H01M 4/58* | (2010.01) | |
| *H01M 4/583* | (2010.01) | |
| *H01M 4/587* | (2010.01) | |
| *H01M 10/0525* | (2010.01) | |
| *H01M 4/04* | (2006.01) | |
| *H01M 10/058* | (2010.01) | |

(52) U.S. Cl.
CPC ......... *H01M 10/0567* (2013.01); *H01M 4/04* (2013.01); *H01M 4/583* (2013.01); *H01M 4/587* (2013.01); *H01M 4/5825* (2013.01); *H01M 10/058* (2013.01); *H01M 10/0525* (2013.01); *H01M 2220/30* (2013.01); *H01M 2300/0025* (2013.01); *Y10T 29/49108* (2015.01)

(58) Field of Classification Search
CPC ...... H01M 4/04; H01M 4/5825; H01M 4/583; H01M 10/0567; H01M 4/587; H01M 10/0525; H01M 10/0568; H01M 2220/30; H01M 2300/0025
See application file for complete search history.

(56) References Cited

U.S. PATENT DOCUMENTS

| | | | | |
|---|---|---|---|---|
| 5,773,167 | A * | 6/1998 | Iwasaki | H01M 4/587 429/231.8 |
| 6,689,511 | B2 * | 2/2004 | Yamada | H01M 2/1066 429/163 |
| 2010/0018034 | A1 | 1/2010 | Iguchi | |
| 2010/0248022 | A1 | 9/2010 | Shirakata et al. | |
| 2011/0020700 | A1 | 1/2011 | Iwaya | |
| 2013/0149603 | A1 | 6/2013 | Ohnuma | |
| 2013/0171514 | A1 | 7/2013 | Hayashi | |

FOREIGN PATENT DOCUMENTS

| | | |
|---|---|---|
| JP | 3658506 B2 | 6/2005 |
| JP | 2005149750 A2 | 6/2005 |
| JP | 2006344390 A2 | 12/2006 |
| JP | 2007173113 A2 | 7/2007 |
| JP | 2008010337 A2 | 1/2008 |
| JP | 2009104838 A2 | 5/2009 |
| JP | 4578933 B2 | 11/2010 |
| JP | 4609751 B2 | 1/2011 |
| JP | 2011054490 A2 | 3/2011 |
| JP | 2011086632 A2 | 4/2011 |
| JP | 2011096672 A2 | 5/2011 |
| WO | 2008032657 A1 | 3/2008 |
| WO | 2009133899 A1 | 11/2009 |
| WO | 2012029505 A1 | 3/2012 |
| WO | 2012053644 A1 | 4/2012 |

OTHER PUBLICATIONS

International Search Report dated May 21, 2013 filed in PCT/JP2013/001819.
Extended European Search Report dated May 2, 2016 issued in the corresponding European patent application No. 13843313.1.

* cited by examiner

*Primary Examiner* — Anca Eoff
(74) *Attorney, Agent, or Firm* — Rankin, Hill & Clark LLP

(57) ABSTRACT

A nonaqueous electrolyte secondary battery including a positive electrode having a positive active material, and an electrolyte, wherein a positive electrode potential at the time of charging is 3.7 V or less with respect to a lithium metal potential, and the electrolyte contains a cyclic sulfate compound having a specific structure.

12 Claims, No Drawings

NONAQUEOUS ELECTROLYTE SECONDARY BATTERY AND METHOD FOR PRODUCING NONAQUEOUS ELECTROLYTE SECONDARY BATTERY

TECHNICAL FIELD

The present invention relates to a nonaqueous electrolyte secondary battery and a method for producing a nonaqueous electrolyte secondary battery.

BACKGROUND ART

As a nonaqueous electrolyte secondary battery, for example, a lithium ion secondary battery in which an electrolyte contains a lithium salt is known. As the use of the lithium ion secondary battery, power supplies of compact electronic devices such as digital cameras and laptop computers are known.

More specifically, as this kind of nonaqueous electrolyte secondary battery, for example, nonaqueous electrolyte secondary batteries, in which a positive active material contains a lithium-containing transition metal oxide such as $LiCoO_2$ or $LiMnO_2$, and an electrolyte contains a cyclic sulfate compound such as 4,4'-bi-1,3,2-dioxathiolane2,2,2',2'-tetraoxide, are known (Patent Document 1).

In some examples of Patent Document 1 is described a nonaqueous electrolyte secondary battery in which the positive active material contains the above-mentioned lithium-containing transition metal oxide, and the electrolyte contains the above-mentioned cyclic sulfate compound. However, the nonaqueous electrolyte secondary battery described in the examples of Patent Document 1 has a problem that the direct-current resistance after being charged and discharged repeatedly at high temperatures is not necessarily low.

PRIOR ART DOCUMENT

Patent Document

Patent Document 1: WO 2012/053644 A

SUMMARY OF THE INVENTION

Problem to be Solved by the Invention

In view of the above-mentioned problem, it is an object of the present invention to provide a nonaqueous electrolyte secondary battery having a relatively low direct-current resistance after being charged and discharged repeatedly at high temperatures.

Means for Solving the Problem

In order to solve the above-mentioned problem, the nonaqueous electrolyte secondary battery according to the present invention includes a positive electrode having a positive active material, and an electrolyte, and is characterized in that the positive electrode potential at the time of charging is 3.7 V or less with respect to a lithium metal potential, and the electrolyte contains a cyclic sulfate compound represented by the following general formula (1):

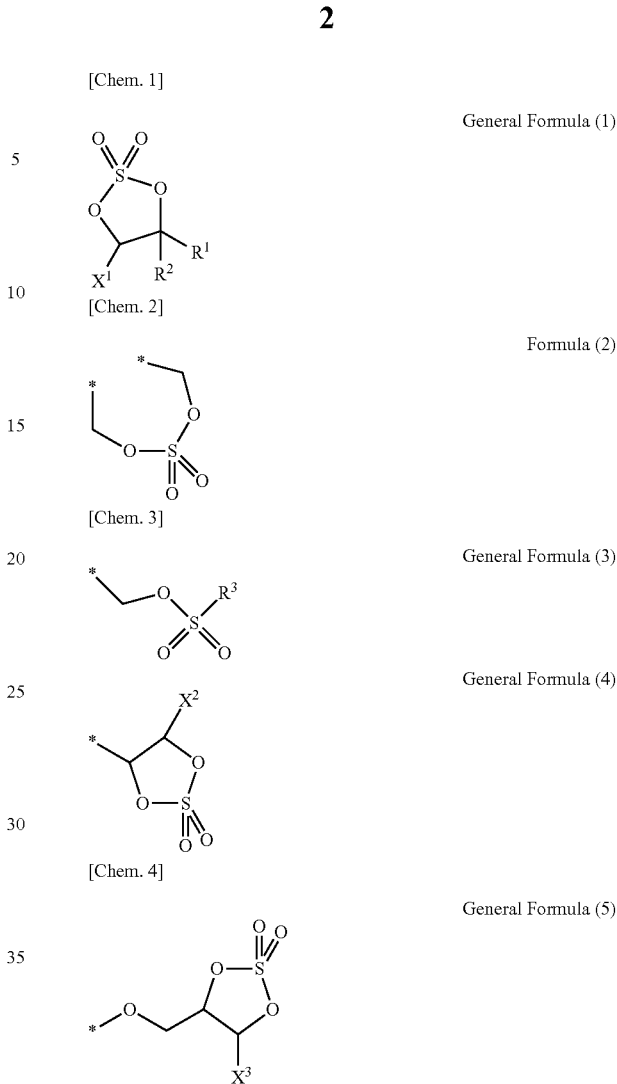

wherein $R^1$ and $R^2$ in the general formula (1) respectively represent groups represented by the formula (2) that are linked with each other, or either of $R^1$ and $R^2$ represents a hydrogen atom and the other represents a group represented by the general formula (3), the general formula (4) or the general formula (5); in the general formula (3), $R^3$ represents an alkyl group having 1 to 3 carbon atoms, which is optionally substituted with a halogen element, or a group represented by the general formula (5); portions of symbol * in the formula (2), the general formula (3), the general formula (4) and the general formula (5) represent a bonding position; and $X^1$, $X^2$, and $X^3$ in the general formula (1), the general formula (4) and the general formula (5) each independently represent a hydrogen atom or a halogen element.

In the nonaqueous electrolyte secondary battery according to the present invention, the positive active material of the positive electrode preferably contains lithium iron phosphate. According to this constitution, it is possible to reduce the direct-current resistance in a battery after being charged and discharged repeatedly at high temperatures.

In the nonaqueous electrolyte secondary battery according to the present invention, it is preferred that the battery further includes a negative electrode having a particulate negative active material, and that the average particle size of the negative active material is 5 to 25 μm. According to this constitution, it is possible to reduce the direct-current resistance in a battery after being charged and discharged repeatedly at high temperatures.

In the nonaqueous electrolyte secondary battery according to the present invention, the negative active material preferably contains amorphous carbon. According to this constitution, it is possible to reduce the direct-current resistance in a battery after being charged and discharged repeatedly at high temperatures.

In the nonaqueous electrolyte secondary battery according to the present invention, the electrolyte preferably contains the cyclic sulfate compound represented by the general formula (1) in an amount of 0.1 to 2.0% by mass with respect to the total mass of the electrolyte. According to this constitution, it is possible to reduce the direct-current resistance in a battery after being charged and discharged repeatedly at high temperatures.

In the nonaqueous electrolyte secondary battery according to the present invention, the electrolyte preferably contains, as the cyclic sulfate compound represented by the general formula (1), at least one cyclic sulfate compound selected from the group consisting of the following formula (6), formula (7), formula (8) and formula (9):

[Chem. 5]

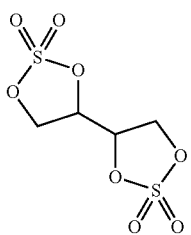

Formula (6)

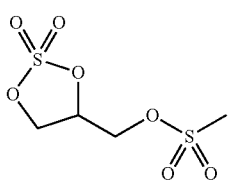

Formula (7)

[Chem. 6]

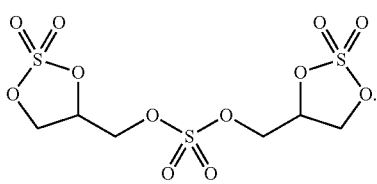

Formula (8)

Formula (9)

Advantages of the Invention

The nonaqueous electrolyte secondary battery of the present invention has an effect of reducing the direct-current resistance in a battery after being charged and discharged repeatedly at high temperatures to a relatively low level.

MODE FOR CARRYING OUT THE INVENTION

Hereinafter, an embodiment of the nonaqueous electrolyte secondary battery of the present invention will be described.

The nonaqueous electrolyte secondary battery of the present embodiment is as described below; however, the present invention is not limited to the nonaqueous electrolyte secondary battery exemplified below.

A nonaqueous electrolyte secondary battery of the present embodiment includes a positive electrode having a positive active material, and an electrolyte. The positive electrode potential at the time of charging is 3.7 V or less with respect to a lithium metal potential, and the electrolyte contains a cyclic sulfate compound represented by the following general formula (1). Further, the electrolyte usually further includes a nonaqueous solvent and an electrolyte salt.

[Chem. 7]

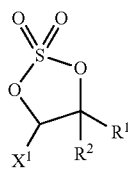

General Formula (1)

[Chem. 8]

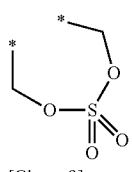

Formula (2)

[Chem. 9]

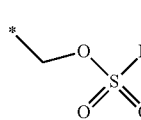

General Formula (3)

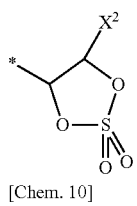

General Formula (4)

[Chem. 10]

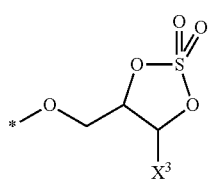

General Formula (5)

wherein $R^1$ and $R^2$ in the general formula (1) respectively represent groups represented by the formula (2) that are linked with each other, or either of $R^1$ and $R^2$ represents a hydrogen atom and the other represents a group represented by the general formula (3), the general formula (4) or the general formula (5); in the general formula (3), $R^3$ represents an alkyl group having 1 to 3 carbon atoms, which is optionally substituted with a halogen element, or a group represented by the general formula (5); portions of symbol * in the formula (2), the general formula (3), the general formula (4) and the general formula (5) represent a bonding position; and $X^1$, $X^2$, and $X^3$ in the general formula (1), the general formula (4) and the general formula (5) each independently represent a hydrogen atom or a halogen element.

In the cyclic sulfate compound represented by the general formula (1), $R^3$ in the general formula (3) is preferably a methyl group or a group represented by the general formula (5). Further, all of $X^1$, $X^2$, and $X^3$ are preferably a hydrogen atom. Specific examples of the cyclic sulfate compound represented by the general formula (1) include compounds represented by the following formulae (6) to (9). The electrolyte preferably contains at least one cyclic sulfate compound selected from the group consisting of the following formula (6), formula (7), formula (8) and formula (9).

[Chem. 11]

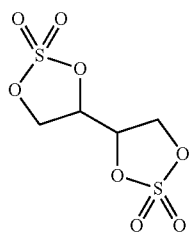

Formula (6)

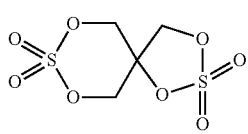

Formula (7)

[Chem. 12]

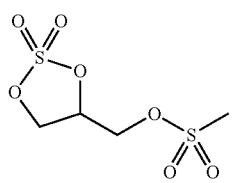

Formula (8)

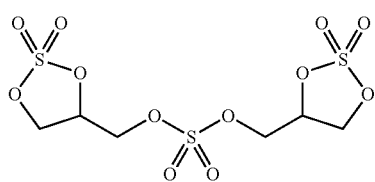

Formula (9)

In the nonaqueous electrolyte secondary battery of the present invention, the positive electrode potential at the time of charging is 3.7 V or less with respect to a lithium metal potential, and the electrolyte contains the cyclic sulfate compound represented by the general formula (1). Therefore, the nonaqueous electrolyte secondary battery of the present invention can reduce the direct-current resistance in a battery after being charged and discharged repeatedly at high temperatures to a relatively low level. Although the detail of the mechanism of such an effect is not necessarily clear, the effect is thought to be produced by the fact that the cyclic sulfate compound represented by the general formula (1) is decomposed on an electrode at an initial stage of use of a battery (at the time of several charge-discharge operations immediately after the completion of the battery) to produce a protective film. That is, in the nonaqueous electrolyte secondary battery, by setting the positive electrode potential at the time of charging to 3.7 V or less with respect to a lithium metal potential, oxidative decomposition of the cyclic sulfate compound on the positive electrode is suppressed. Thus, the cyclic sulfate compound is thought to be mainly reductively decomposed on the negative electrode to produce a robust and stable protective film on the surface of the negative electrode. Since the protective film produced on the surface of the negative electrode has been produced without affected by oxidative decomposition, the film has high reducibility and good affinity with lithium ions. The above-mentioned effect is thought to be exerted by formation of this peculiar protective film.

The positive electrode potential at the time of charging is 3.7 V or less with respect to a lithium metal potential. Since the battery voltage is generally a difference between the positive electrode potential and the negative electrode potential, the positive electrode potential at the time of charging is calculated by adding the negative electrode potential at the time of charging to the battery voltage at the time of charging. Further, the negative electrode potential at the time of charging is a potential with respect to the lithium metal, and it is determined using a single electrode battery in which lithium metal is used as a counter electrode. The description "the positive electrode potential at the time of charging is 3.7 V or less with respect to a lithium metal potential" means that the positive electrode potential calculated from the battery voltage at the time of charging and the negative electrode potential at the time of charging is 3.7 V or less. In addition, there may be cases where the positive electrode potential at the time of charging becomes more than 3.7 V by setting the end-of-charge voltage of a battery in a battery charger high. Even in such a case, no influence on the effect of the present invention is found as long as the capacity of a region where the positive electrode potential at the time of charging is more than 3.7 V is 5% or less with respect to the capacity of the entire charging region. The entire charging region referred to herein refers to a region between an end-of-discharge voltage and an end-of-charge voltage. Further, the positive electrode potential at the time of charging can be controlled by adjusting the charge voltage of a battery. The positive electrode potential at the time of charging is usually 2.5 V or more.

The electrolyte preferably contains the cyclic sulfate compound represented by the general formula (1) in an amount of 0.1% by mass or more and 2.0% by mass or less with respect to the total mass of the electrolyte. Since a protective film having a proper thickness is produced when the electrolyte contains the cyclic sulfate compound represented by the general formula (1) in an amount of 0.1% by mass or more, it is possible to reduce the direct-current resistance in a battery after being charged and discharged repeatedly at high temperatures. Since a protective film having a proper thickness is produced when the electrolyte contains the cyclic sulfate compound represented by the general formula (1) in an amount of 2.0% by mass or less, it is possible to reduce the direct-current resistance in a battery after being charged and discharged repeatedly at high temperatures. Further, the cyclic sulfate compound represented by the general formula (1) is consumed by formation of the protective film. Therefore, it has been confirmed that the content of the cyclic sulfate compound represented by the general formula (1) in the nonaqueous electrolyte of a battery after being charged and discharged is significantly decreased.

As the nonaqueous solvent, solvents generally used in a nonaqueous electrolyte secondary battery and the like are employed.

Specific examples of the nonaqueous solvents include cyclic carbonates, lactones, chain carbonates, chain esters, nitriles and the like. Examples of the cyclic carbonates include propylene carbonate, ethylene carbonate, butylene carbonate, chloroethylene carbonate and the like. Examples of the lactones include γ-butyrolactone, γ-valerolactone and the like. Examples of the chain carbonates include dimethyl carbonate, diethyl carbonate, ethylmethyl carbonate and the like. Examples of the chain esters include methyl formate, methyl acetate, methyl butyrate and the like. Examples of the nitriles include acetonitrile, benzonitrile and the like. Moreover, examples of the nonaqueous solvents include tetrahydrofuran and derivatives thereof, dioxolan and derivatives thereof, ethylene sulfide, sulfolane, sultone and derivatives thereof and the like. As the nonaqueous solvent, the above-mentioned compounds may be used singly, or may be used as a mixture of two or more thereof, but the nonaqueous solvent is not limited to these.

Examples of the electrolyte salt include lithium salts such as $LiClO_4$, $LiBF_4$, $LiAsF_6$, $LiPF_6$, $LiCF_3SO_3$, $LiN(SO_2CF_3)_2$, $LiN(SO_2C_2F_5)_2$, $LiN(SO_2CF_3)(SO_2C_4F_9)$, LiSCN, LiBr, LiI, $Li_2SO_4$, and $Li_2B_{10}Cl_{10}$. As the electrolyte salt, the above-mentioned compounds may be used singly, or may be used as a mixture of two or more thereof, but the electrolyte salt is not limited to these.

The concentration of the electrolyte salt in the electrolyte is preferably 0.5 to 5.0 mol/L, and more preferably 1.0 to 2.5 mol/L in order to reliably obtain a nonaqueous electrolyte battery having excellent battery characteristics.

The positive electrode and the negative electrode in the nonaqueous electrolyte secondary battery of the present embodiment respectively include a current collector formed into a sheet-shape and composite layers disposed on both surfaces of the current collector. Each composite layer includes at least a positive active material or a negative active material, and further includes a conducting agent, a binder, a thickener, a filler and the like as required.

Examples of the material of the current collector include metals such as aluminum and copper, conductive polymers and conductive glass. The current collector may be formed into a sheet-shape or a net-shape. As the current collector of the positive electrode, an aluminum or aluminum alloy sheet is preferably used. As the current collector of the negative electrode, a copper or copper alloy sheet is preferably used.

The positive active material included in the positive electrode preferably contains lithium iron phosphate. When the positive active material contains lithium iron phosphate, there is an advantage that the direct-current resistance in a battery after being charged and discharged repeatedly at high temperatures can be reduced. Further, the lithium iron phosphate has a large charge-discharge capacity at 3.7 V or less with respect to a metal lithium potential. Therefore, when the positive active material contains lithium iron phosphate, the battery capacity can be increased. The lithium iron phosphate has an olivine crystal structure, and its chemical composition is represented by the general formula $Li_xFe_{1-z}M_z(PO_4)_y$ ($0.85 \leq x \leq 1.10$, $0.95 \leq y \leq 1.05$, $0 \leq z \leq 0.5$, M is a metal other than Fe). M is preferably Co, Al, Cr, Mg, Mn, Ni, or Ti, and a part of $PO_4$ may be substituted with another anion such as $BO_3$, $SiO_4$, $WO_4$, or $MoO_4$.

The positive active material may contain two or more positive active materials. Specifically, as the positive active material, for example, a mixture of lithium iron phosphate and a positive active material other than lithium iron phosphate can be used. As the positive active material which can be mixed with lithium iron phosphate, for example, $LiM1O_2$ having a layered rock salt structure, or $LiM2_2O_4$ having spinel structure (M1 and M2 are respectively at least one element selected from transition metal elements) can be used. Further, as the positive active material, specifically, particles formed by making lithium iron phosphate particles support carbon are employed.

The conducting agent is not particularly limited, and examples thereof include natural graphite (scaly graphite, flaky graphite, earthy graphite, etc.), artificial graphite, amorphous carbon (coke, carbon black, acetylene black, Ketjen black, etc.), carbon whiskers, carbon fibers, conductive ceramics and the like. As the conducting agent, for example, one of the above materials or a mixture of two or more of the above materials is employed.

The binder is not particularly limited, and examples thereof include thermoplastic resins such as polytetrafluoroethylene (PTFE), polyvinylidene fluoride (PVDF), polyethylene and polypropylene; and ethylene-propylene-diene terpolymer (EPDM), sulfonated EPDM, styrene-butadiene rubber (SBR), fluororubber and the like. As the binder, for example, one of the above materials or a mixture of two or more of the above materials is employed.

The thickener is not particularly limited, and examples thereof include polysaccharides such as carboxymethyl cellulose and methyl cellulose. As the thickener, for example, one of the above materials or a mixture of two or more of the above materials is employed.

The filler is not particularly limited, and examples thereof include olefin-based polymers such as polypropylene and polyethylene; amorphous silica, alumina, zeolite, glass and the like.

Examples of the negative active material include carbonaceous materials, lithium metal, alloys capable of storing and releasing lithium ions (lithium alloys, etc.), metal oxides represented by the general formula $MO_z$ (M represents at least one element selected from among W, Mo, Si, Cu and Sn, and z is a numerical value in the range of $0<z\leq 2$), lithium metal oxides ($Li_4Ti_5O_{12}$, etc.), polyphosphate compounds and the like.

Examples of the carbonaceous material include amorphous carbon such as non-graphitizable carbon (hard carbon), easily graphitizable carbon (soft carbon) and coke, graphite and the like.

The amorphous carbon is a carbon material in which the degree of growth of a hexagonal network structure is small, and the spacing of a (002) plane measured by a wide angle X-ray diffraction method is 3.45 angstroms or more. In contrast, the graphite is a carbon material in which the spacing of a (002) plane measured by a wide angle X-ray diffraction method is less than 3.45 angstroms.

The negative active material preferably contains the above-mentioned amorphous carbon. The amorphous carbon has lower reactivity with the cyclic sulfate compound than the graphite. Therefore, when the negative active material contains the amorphous carbon, it is possible to prevent the cyclic sulfate compound from reacting excessively at an initial stage of use of a battery (at the time of several charge-discharge operations immediately after the completion of a battery), resulting in formation of a protective film having a preferred thickness. Accordingly, it is possible to reduce the direct-current resistance in a battery after being charged and discharged repeatedly when the negative active material contains the amorphous carbon. The negative active material may be a mixture of the amorphous carbon and the graphite as the carbonaceous material, or may be one that contains only the amorphous carbon as the carbonaceous material.

The negative active material is preferably particles having the amorphous carbon at least on the surface thereof. Examples of such particles include particles of the amorphous carbon and particles obtained by coating the surfaces of graphite particles with the amorphous carbon. Examples of a method of coating graphite particles with the amorphous carbon include common methods, such as a method of rubbing the amorphous carbon onto the graphite particles, a method of coating the graphite particles with the amorphous carbon by a mechanochemical method, and a method of coating the graphite particles with the amorphous carbon by a chemical vapor deposition (CVD) method. As the particles obtained by coating the surfaces of graphite particles with the amorphous carbon, for example, particles obtained by coating the surfaces of graphite particles with the amorphous carbon in an amount of 4 to 6% by mass with respect to the amount of graphite particles are employed. Further, the negative active material may contain particles having the amorphous carbon at least on the surface thereof, such as amorphous carbon particles, and graphite particles. As the mixing ratio between the particles having the amorphous carbon at least on the surface thereof and the graphite particles, for example, a ratio by mass of 60:40 to 70:30 is employed.

The negative active material is preferably one having an average particle size of 5 to 25 µm, and more preferably one containing the amorphous carbon and having an average particle size of 5 to 25 µm. Due to the average particle size within the above-mentioned range, a reaction between the cyclic sulfate compound and the particle surface of the negative active material proceeds to an adequate degree, and thereby a protective film having a preferred thickness can be formed on the negative electrode. Therefore, the direct-current resistance in a battery after being charged and discharged repeatedly can be reduced. When the average particle size is 5 µm or more, there is an advantage that the reaction as described above proceeds to an adequate degree and the protective film comes to have a moderate thickness. Further, when the average particle size is 25 µm or less, there is an advantage that the continuation of an intermittent reaction of the cyclic sulfate compound after the initial charge is suppressed and a moderately thin protective film can be obtained. The average particle size of the negative active material can be adjusted so as to be within the above range, for example, by pulverizing the negative active material into particles, and classifying the particles by a common method.

The average particle size of the negative active material particles is a particle size at which the cumulative percentage in the particle size distribution on the volumetric basis is 50% (D50). Measurement of the particle size distribution is carried out by following the conditions and procedure described below.

That is, as a measurement apparatus, a particle size distribution analyzer (SALD-2000, manufactured by SHIMADZU CORPORATION) of laser diffraction-scattering type is used. First, in preparation for the measurement, the apparatus is turned on, an X-axis and a Y-axis of a laser section are adjusted, and centering of a detector is carried out. Then, the negative active material is adequately kneaded with an anionic surfactant predominantly composed of linear sodium alkylbenzene sulfonate, and then ion-exchange water (water from which ions have been removed by using an ion-exchange resin) is added thereto to prepare a measurement sample. For the measurement, blank measurement is selected in an operational screen of the measurement apparatus, and background data is measured in a state in which only water is circulated through a measurement section. Next, the sample is charged into the measurement section of the measurement apparatus. Here, the amount of the sample to be charged is adjusted so that the peak of diffraction/scattering light intensity curve displayed in the operational section of the apparatus is 20 to 40%. After charging, the sample is irradiated with ultrasonic waves for 15 minutes in the measurement section. Thereafter, a sample measurement program is executed from the operational screen to perform measurement two times, and the mean value of the two measurements is output as a measurement result. The measurement result is acquired as a particle size distribution histogram and a D50 value (D50 is a particle size at which the cumulative volume in the particle size distribution of particles reaches 50%).

The nonaqueous electrolyte secondary battery usually further includes a separator disposed between the positive electrode and the negative electrode. Further, the nonaqueous electrolyte secondary battery usually further includes a casing body with which the positive electrode, the negative electrode, and the electrolyte are packaged. Examples of the separator include separators formed of a porous membrane, a nonwoven fabric or the like. The separator is formed of, for example, a porous membrane or a nonwoven fabric alone, or a combination of these.

Examples of materials of the separator include polyolefin-based resins such as polyethylene and polypropylene; polyester-based resins such as polyethylene terephthalate and polybutylene terephthalate; fluororesins; and the like. Examples of the fluororesins include polyvinylidene fluoride, vinylidene fluoride-hexafluoropropylene copolymers, and vinylidene fluoride-perfluorovinyl ether copolymers.

Examples of the material of the casing body include iron plated with nickel, stainless steel, aluminum, a metal-resin composite film, glass and the like.

The type of the nonaqueous electrolyte secondary battery is not particularly limited, and examples thereof include coin batteries, button batteries, prismatic batteries, flat type batteries, cylindrical batteries and the like, respectively including a positive electrode, a negative electrode and a separator.

The nonaqueous electrolyte secondary battery of the present embodiment can be produced by a publicly known common method.

In the production of the nonaqueous electrolyte secondary battery, the positive electrode or the negative electrode is prepared, for example, in the following manner. That is, the positive active material or the negative active material, the conducting agent, the binder or the thickener are added to a solvent in which the binder and the thickener can be dissolved or dispersed, and the solution or dispersion is mixed to give a slurry. The slurry is applied to both surfaces of a sheet-shaped positive current collector and dried to prepare a positive electrode or a negative electrode. In the above-mentioned mixing, a method of mixing by use of a powder mixer such as a V-shaped mixer, an S-shaped mixer, a grinding mixer, a ball mill, or a planetary ball mill is employed. As the mixing method, a method of dry- or wet-mixing is employed. In order to apply a slurry to the current collector, an application method such as roller coating with an applicator roll or the like, screen coating, blade coating, spin coating or bar coating is employed. Then, the positive electrode and the negative electrode are layered or wound with the separator interposed therebetween to form an electrode element, the element is encapsulated in a casing material, an electrolyte solution is injected into the casing material, and the casing material is sealed to produce a nonaqueous electrolyte secondary battery.

EXAMPLES

Next, the present invention will be described in more detail by way of examples; however, the present invention is not limited to these examples.

Example 1

(1) Preparation of Positive Electrode

Carbon-supported lithium iron phosphate ($LiFePO_4$) was used as a positive active material. In order to prepare particulate $LiFePO_4$, first, iron powder, ammonium dihydrogen phosphate, and lithium carbonate were weighed so that the molar ratio among these compound became 2:2:1, and mixed. Thereafter, ethanol as a solvent was added, and the resulting mixture was wet-pulverized/mixed for 2 hours by a ball mill to give a raw material mixed powder. The mixed powder was fired at 700° C. for 5 hours in a reductive atmosphere, and pulverized to give particulate $LiFePO_4$. Then, 90 parts by mass of the obtained $LiFePO_4$, 5 parts by mass of polyvinylidene fluoride as a binder, and 5 parts by mass of acetylene black as a conducting agent were mixed, and N-methyl-2-pyrrolidone as a solvent was added thereto to prepare a positive electrode slurry. Thereafter, the positive electrode slurry was applied to both surfaces of an aluminum foil having a thickness of 20 μm and dried to prepare a positive electrode.

(2) Preparation of Negative Electrode

First, 92 parts by mass of amorphous carbon having an average particle size of 15 as a negative active material, and 8 parts by mass of polyvinylidene fluoride as a binder were mixed, and. N-methyl-2-pyrrolidone as a solvent was added thereto to prepare a negative electrode slurry. Thereafter, the negative electrode slurry was applied to both surfaces of a copper foil having a thickness of 10 μm and dried to prepare a negative electrode.

(3) Preparation of Electrolyte

As the electrolyte, an electrolyte prepared by the following method was used. That is, a solution was prepared by forming a mixed solvent of ethylene carbonate (EC), dimethyl carbonate (DMC) and ethylmethyl carbonate (EMC) in proportions of 3:3:4 (by volume), and adding and dissolving $LiPF_6$ in the mixed solvent so that the final concentration became 1 mol/L. Moreover, a compound of the formula (6) was added so that its amount was 1.0% by mass with respect to the total mass of the electrolyte to prepare an electrolyte.

(4) Assembling of Battery

The positive electrode and the negative electrode were wound with a separator (microporous membrane made of polyethylene) interposed therebetween, and then housed in an aluminum square container case (49.3 mm high, 33.7 mm wide and 5.17 mm thick). Then, the electrolyte was injected into the case, and the case was sealed by laser sealing to prepare a battery. Thereby, a square nonaqueous electrolyte secondary battery having a design capacity of 450 mAh was prepared.

Examples 2 to 16

Each lithium ion secondary battery was prepared in the same manner as in Example 1 except that the materials constituting the battery were changed to the materials shown in Table 1 or Table 2.

In Example 6, particles formed by coating graphite particles with amorphous carbon (graphite coated with amorphous carbon) were used as a negative active material in place of the particles of amorphous carbon. The graphite coated with amorphous carbon was one formed by coating graphite particles with amorphous carbon by a CVD method, that is, by coating the surface of the graphite with the amorphous carbon in an amount of about 5% with respect to the total mass of the graphite particles. Further, in Example 7, the natural graphite used as a negative active material in place of the amorphous carbon is common natural graphite which has an average particle size of 15 μm and is not coated. In addition, the lithium-nickel-cobalt-manganese composite oxide ($LiNi_{0.45}Co_{0.1}Mn_{0.45}O_2$) used as a positive active material in place of lithium iron phosphate was prepared by the following common synthesis method. That is, a manganese sulfate hydrate, a nickel sulfate hydrate, and a cobalt sulfate hydrate were mixed at a predetermined molar ratio and dissolved in an aqueous solution, and then a precursor of Ni—Co—Mn was obtained by a coprecipitation method. The precursor and a predetermined amount of lithium hydroxide were mixed and fired at 900° C. for 10 hours in the air to give $LiNi_{0.45}Co_{0.1}Mn_{0.45}O_2$.

Comparative Examples 2 to 5

Each lithium ion secondary battery was prepared in the same manner as in Example 1 except that the materials constituting the battery were changed to the materials shown in Table 1 or Table 2.

Comparative Examples 1 and 6 to 7

Each lithium ion secondary battery was prepared in the same manner as in Example 1 except that the materials constituting the battery were changed to the materials shown in Table 1. A compound used in place of the cyclic sulfate compound represented by the general formula (1) was 4-propyl-1,3,2-dioxathiolane2,2-dione (PEGS).

The detailed constitutions of the lithium ion secondary batteries prepared in the examples and comparative examples are shown in Table 1 and Table 2.

TABLE 1

| | Charge voltage of positive electrode (V vs $Li/Li^+$) | Positive active material | Negative active material | Average particle size of negative active material (μm) | Cyclic sulfate compound | Additive amount of cyclic sulfate compound (mass %) | Direct-current resistance after cycle (mΩ) |
|---|---|---|---|---|---|---|---|
| Example 1 | 3.7 | $LiFePO_4$ | Amorphous carbon | 15 | Compound of formula (6) | 1.0 | 124.7 |
| Example 2 | 3.7 | $LiNi_{0.45}Co_{0.1}Mn_{0.45}O_2$ | Amorphous carbon | 15 | Compound of formula (6) | 1.0 | 175.6 |
| Comparative Example 1 | 3.7 | $LiFePO_4$ | Amorphous carbon | 15 | None | 1.0 | 448.8 |
| Comparative Example 2 | 4.3 | $LiNi_{0.45}Co_{0.1}Mn_{0.45}O_2$ | Amorphous carbon | 15 | Compound of formula (6) | 1.0 | 239.0 |

TABLE 1-continued

| | Charge voltage of positive electrode (V vs Li/Li+) | Positive active material | Negative active material | Average particle size of negative active material (μm) | Cyclic sulfate compound | Additive amount of cyclic sulfate compound (mass %) | Direct-current resistance after cycle (mΩ) |
|---|---|---|---|---|---|---|---|
| Comparative Example 3 | 4.3 | LiNi$_{0.45}$Co$_{0.1}$Mn$_{0.45}$O$_2$ | Amorphous carbon | 15 | Compound of formula (8) | 1.0 | 272.6 |
| Comparative Example 4 | 4.3 | LiNi$_{0.45}$Co$_{0.1}$Mn$_{0.45}$O$_2$ | Amorphous carbon | 15 | Compound of formula (7) | 1.0 | 348.0 |
| Comparative Example 5 | 4.3 | LiNi$_{0.45}$Co$_{0.1}$Mn$_{0.45}$O$_2$ | Amorphous carbon | 15 | Compound of formula (9) | 1.0 | 298.7 |
| Example 3 | 3.7 | LiFePO$_4$ | Amorphous carbon | 15 | Compound of formula (8) | 1.0 | 132.9 |
| Example 4 | 3.7 | LiFePO$_4$ | Amorphous carbon | 15 | Compound of formula (7) | 1.0 | 162.9 |
| Example 5 | 3.7 | LiFePO$_4$ | Amorphous carbon | 15 | Compound of formula (9) | 1.0 | 171.1 |
| Comparative Example 6 | 3.7 | LiFePO$_4$ | Amorphous carbon | 15 | PEGS (comparative compound) | 1.0 | 272.7 |

TABLE 2

| | Charge voltage of positive electrode (V vs Li/Li+) | Positive active material | Negative active material | Average particle size of negative active material (μm) | Cyclic sulfate compound | Additive amount of cyclic sulfate compound (mass %) | Direct-current resistance after cycle (mΩ) |
|---|---|---|---|---|---|---|---|
| Example 6 | 3.7 | LiFePO$_4$ | Graphite coated with amorphous carbon | 15 | Compound of formula (6) | 1.0 | 140.2 |
| Example 7 | 3.7 | LiFePO$_4$ | Natural graphite | 15 | Compound of formula (6) | 1.0 | 219.4 |
| Example 8 | 3.7 | LiFePO$_4$ | Amorphous carbon | 15 | Compound of formula (6) | 0.1 | 184.2 |
| Example 9 | 3.7 | LiFePO$_4$ | Amorphous carbon | 15 | Compound of formula (6) | 0.2 | 163.7 |
| Example 10 | 3.7 | LiFePO$_4$ | Amorphous carbon | 15 | Compound of formula (6) | 2.0 | 129.1 |
| Example 11 | 3.7 | LiFePO$_4$ | Amorphous carbon | 15 | Compound of formula (6) | 3.0 | 198.0 |
| Example 12 | 3.7 | LiFePO$_4$ | Amorphous carbon | 3 | Compound of formula (6) | 1.0 | 132.5 |
| Example 13 | 3.7 | LiFePO$_4$ | Amorphous carbon | 5 | Compound of formula (6) | 1.0 | 114.7 |
| Example 14 | 3.7 | LiFePO$_4$ | Amorphous carbon | 10 | Compound of formula (6) | 1.0 | 113.6 |
| Example 15 | 3.7 | LiFePO$_4$ | Amorphous carbon | 25 | Compound of formula (6) | 1.0 | 131.0 |
| Example 16 | 3.7 | LiFePO$_4$ | Amorphous carbon | 30 | Compound of formula (6) | 1.0 | 156.8 |
| Comparative Example 7 | 3.7 | LiFePO$_4$ | Amorphous carbon | 15 | PEGS (comparative compound) | 3.0 | 304.0 |

Examples 17 and 18

Different two types of active materials were mixed and used as a negative active material. That is, natural graphite (the same one as in Example 7) was used as a negative active material A, and graphite coated with amorphous carbon (the same one as in Example 6) was used as a negative active material B. The mixing ratio between the negative active material A and the negative active material B was 70:30 (by mass) in Example 17, and 60:40 (by mass) in Example 18.

The detailed constitutions of the lithium ion secondary batteries of Examples 17 and 18 are shown in Table 3.

The direct-current resistance value after cycle charge-discharge (direct-current resistance value after the cycle test) of the lithium ion secondary batteries of the examples and comparative examples was measured in the following manner. Further, in order to control the positive electrode potential at the time of charging, the potential of the negative electrode used in each battery was measured in advance. The details of measurement of the potential of the negative electrode will be described below.

<Measurement of Potential of Negative Electrode>

The potential with respect to the lithium metal potential in the negative electrode used in each battery was measured in

TABLE 3

| | Negative active material A | Average particle size of negative active material A (μm) | Negative active material B | Average particle size of negative active material B (μm) | A:B (by mass) | Direct-current resistance after cycle (mΩ) |
|---|---|---|---|---|---|---|
| Example 17 | Natural graphite | 15 | Graphite coated with amorphous carbon | 15 | 70:30 | 192.1 |
| Example 18 | Natural graphite | 15 | Graphite coated with amorphous carbon | 15 | 60:40 | 163.8 | the following manner. That is, using a three-pole beaker cell, each negative electrode was attached to a working electrode, lithium metal was attached to a counter electrode and a reference electrode, and an electrolyte was added. As the electrolyte, a solution obtained by dissolving $LiClO_4$ in a mixed solvent of ethylene carbonate (EC) and diethyl carbonate (DEC) in proportions of 5:5 (by volume) so that the final concentration became 1 mol/L was used. Constant current constant voltage charge of each beaker cell was carried out at 25° C. for 24 hours under conditions of a current density of 0.5 $mA/cm^2$, a charge voltage of 0.02 V and an end current of 0.05 mA, and the transition of the potential of the negative electrode used in each battery with respect to a lithium metal potential was measured. In the transition of the potential, a region where the transition of the potential is relatively flat and smooth is present at an end stage of charging in which the potential is 1.0 V or less with respect to the metal lithium potential, and the arithmetic average of potentials in the region was taken as the "potential of the negative electrode at the time of charging". Consequently, the "potential of the negative electrode at the time of charging" of the amorphous carbon used in Examples 1 to 5 and 8 to 16 and Comparative Examples 1 to 7 was 0.15 V. Further, the "potential of the negative electrode at the time of charging" of the natural graphite and the graphite coated with amorphous carbon used in Examples 6 to 7 and 17 to 18 was 0.1 V.

<Charge-Discharge Cycle Test at 60° C.>

Each battery was charged at a constant current of 450 mA up to a predetermined voltage, and further charged at a constant voltage for 3 hours in total. The predetermined voltage was determined by calculation so that the potential becomes the charge potential of the positive electrode shown in Table 1 and Table 2 based on the "potential of the negative electrode at the time of charging" measured in advance. That is, in Examples 1 to 5, Examples 8 to 16, Comparative Example 1 and Comparative Examples 6 to 7, the predetermined voltage was set to 3.55 V. In Examples 6 to 7 and 17 to 18, the predetermined voltage was set to 3.60 V. Further, in Comparative Examples 2 to 5, the predetermined voltage was set to 4.15 V. After charging, each battery was discharged at a constant current of 450 mA under a condition of an end voltage of 2.0 V. This charge-discharge cycle was repeated 300 times in a constant-temperature bath at 60° C.

<Measurement Test of Direct-Current Resistance Value>

Each battery after the cycle test was charged at a constant current of 90 mA at 25° C. for 2.5 hours, and then a voltage (E1) at the time of discharging at 90 mA (I1) for 10 seconds, and a voltage (E2) at the time of discharging at 225 mA (I2) for 10 seconds were measured. Using these measurements, a direct-current resistance value (Rx) at 25° C. was calculated from the following equation.

$Rx=(E1-E2)/$Discharge Current $(I2-I1)$

As can be understood from Tables 1 to 3, the batteries of the examples, in which the positive electrode potential at the time of charging is 3.7 V or less with respect to a lithium metal potential and which include the electrolyte containing a cyclic sulfate compound represented by the general formula (1), had a relatively low direct-current resistance after being charged and discharged repeatedly at high temperatures. The charge-discharge capacity at the time of charge-discharge cycle test at 60° C. of each of the batteries (Examples 1 and 3 to 16) using the positive electrode containing lithium iron phosphate was mostly about 450 mAh, which is roughly equal to the design capacity. On the other hand, in the battery (Example 2) using the positive electrode containing $LiNi_{0.45}Co_{0.1}Mn_{0.45}O_2$, the charge-discharge capacity at the time of charge-discharge cycle test at 60° C. was about 68 mAh, which is about 15% of the design capacity, by setting the charge potential of the positive electrode to 3.7 V or less. It is understood from this result that the energy density can be increased when the positive electrode containing lithium iron phosphate is used. Further, it is thought that a reaction between the cyclic sulfate compound and the particle surface of the negative active material proceeds to an adequate degree, and thereby a protective film having a preferred thickness can be formed on the negative electrode when the negative active material contains the particles having an average particle size of 5 to 25 μm. Therefore, the direct-current resistance in a battery after being charged and discharged repeatedly is thought to be reduced. Further, it is thought that the direct-current resistance in a battery after being charged and discharged repeatedly is reduced when the negative active material contains the amorphous carbon.

The invention claimed is:

1. A nonaqueous electrolyte secondary battery comprising a positive electrode having a positive active material, a negative electrode, and an electrolyte, wherein a positive electrode potential at the time of charging is 3.7 V or less with respect to a lithium metal potential, the negative electrode comprises amorphous carbon having a spacing of a (002) plane measured by a wide angle X-ray diffraction method of 3.45 angstroms or more, and the electrolyte contains a cyclic sulfate compound represented by the following general formula (1):

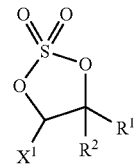

General Formula (1)

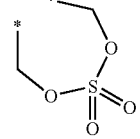

Formula (2)

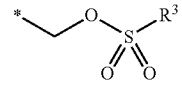

General Formula (3)

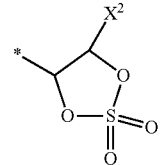

General Formula (4)

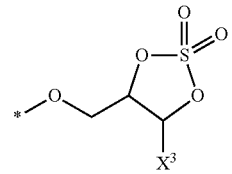

General Formula (5)

wherein $R^1$ and $R^2$ in the general formula (1) respectively represent groups represented by the formula (2) that are linked with each other, or either of $R^1$ and $R^2$ represents a hydrogen atom and the other represents a group represented by the general formula (3), the general formula (4) or the general formula (5); in the general formula (3), $R^3$ represents an alkyl group having 1 to 3 carbon atoms, which is optionally substituted with a halogen element, or a group represented by the general formula (5); portions of symbol*in the formula (2), the general formula (3), the general formula (4) and the general formula (5) represent a bonding position; and $X^1$, $X^2$, and $X^3$ in the general formula (1), the general formula (4) and the general formula (5) each independently represent a hydrogen atom or a halogen element.

2. The nonaqueous electrolyte secondary battery according to claim 1, wherein the positive active material of the positive electrode contains lithium iron phosphate.

3. The nonaqueous electrolyte secondary battery according to claim 1, wherein the amorphous carbon has an average particle size of 5 to 25 μm.

4. The nonaqueous electrolyte secondary battery according to claim 1, wherein the electrolyte contains the cyclic sulfate compound represented by the general formula (1) in an amount of 0.1 to 2.0% by mass with respect to the total mass of the electrolyte.

5. The nonaqueous electrolyte secondary battery according to claim 1, wherein the electrolyte contains, as the cyclic sulfate compound represented by the general formula (1), at least one cyclic sulfate compound selected from the group consisting of the following formula (6), formula (7), formula (8) and formula (9):

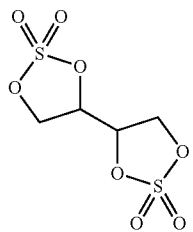

Formula (6)

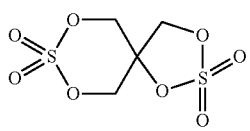

Formula (7)

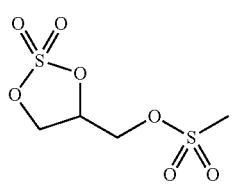

Formula (8)

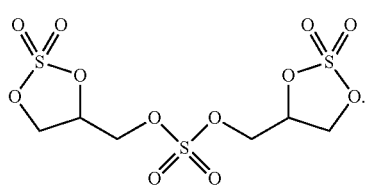

Formula (9)

6. The nonaqueous electrolyte secondary battery according to claim 2, wherein the amorphous carbon has an average particle size of 5 to 25 μm.

7. The nonaqueous electrolyte secondary battery according to claim 2, wherein the electrolyte contains the cyclic sulfate compound represented by the general formula (1) in an amount of 0.1 to 2.0% by mass with respect to the total mass of the electrolyte.

8. The nonaqueous electrolyte secondary battery according to claim 2, wherein the electrolyte contains, as the cyclic sulfate compound represented by the general formula (1), at least one cyclic sulfate compound selected from the group consisting of the following formula (6), formula (7), formula (8) and formula (9):

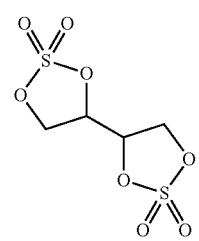

Formula (6)

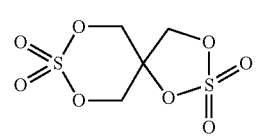

Formula (7)

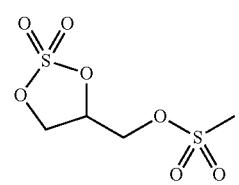

Formula (8)

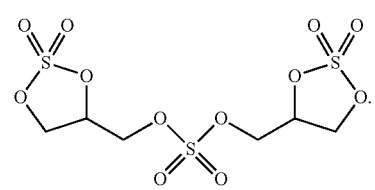

Formula (9)

9. The nonaqueous electrolyte secondary battery according to claim 3, wherein the electrolyte contains the cyclic sulfate compound represented by the general formula (1) in an amount of 0.1 to 2.0% by mass with respect to the total mass of the electrolyte.

10. The nonaqueous electrolyte secondary battery according to claim 3, wherein the electrolyte contains, as the cyclic sulfate compound represented by the general formula (1), at least one cyclic sulfate compound selected from the group consisting of the following formula (6), formula (7), formula (8) and formula (9):

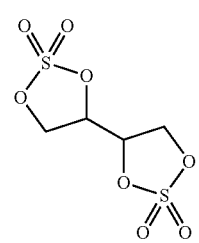

Formula (6)

-continued

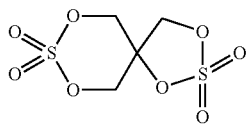
Formula (7)

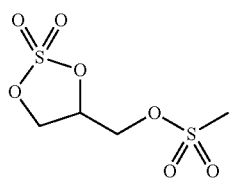
Formula (8)

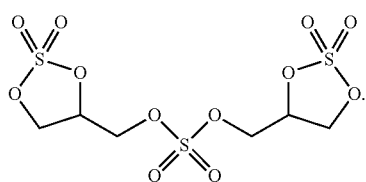
Formula (9)

11. The nonaqueous electrolyte secondary battery according to claim 4, wherein the electrolyte contains, as the cyclic sulfate compound represented by the general formula (1), at least one cyclic sulfate compound selected from the group consisting of the following formula (6), formula (7), formula (8) and formula (9):

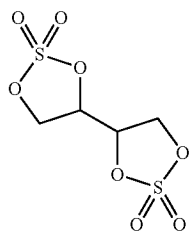
Formula (6)

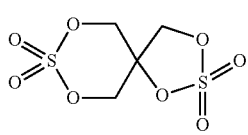
Formula (7)

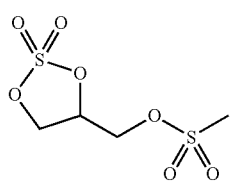
Formula (8)

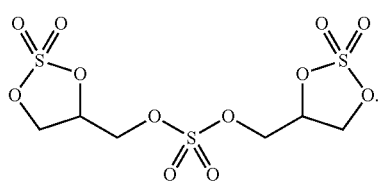
Formula (9)

12. A method for producing a nonaqueous electrolyte secondary battery comprising a positive electrode having a positive active material, a negative electrode, and an electrolyte, wherein a positive electrode potential at the time of charging is 3.7 V or less with respect to a lithium metal potential, the negative electrode comprises amorphous carbon having a spacing of a (002) plane measured by a wide angle X-ray diffraction method of 3.45 angstroms or more, and the electrolyte contains a cyclic sulfate compound represented by the general formula (1) in an amount of 0.1 to 2.0% by mass with respect to the total mass of the electrolyte

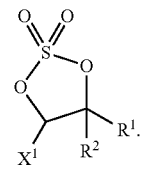
General Formula (1)

wherein $R^1$ and $R^2$ in the general formula (1) respectively represent groups represented by the formula (2) that are linked with each other, or either of $R^1$ and $R^2$ represents a hydrogen atom and the other represents a group represented by the general formula (3), the general formula (4) or the general formula (5); in the general formula (3), $R^3$ represents an alkyl group having 1 to 3 carbon atoms, which is optionally substituted with a halogen element, or a group represented by the general formula (5); portions of symbol * in the formula (2), the general formula (3), the general formula (4) and the general formula (5) represent a bonding position; and $X^1$, $X^2$, and $X^3$ in the general formula (1), the general formula (4) and the general formula (5) each independently represent a hydrogen atom or a halogen element,

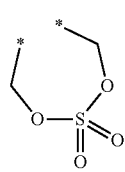
Formula (2)

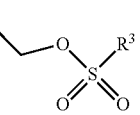
General Formula (3)

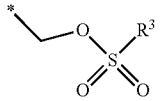
General Formula (4)

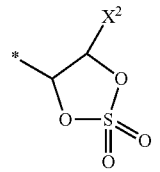
General Formula (5)

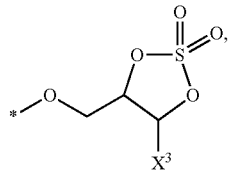

the method comprising providing the positive electrode, the negative electrode, and the electrode in a battery case.

* * * * *